United States Patent [19]

Scott

[11] Patent Number: 4,649,622
[45] Date of Patent: Mar. 17, 1987

[54] TOOL CHANGING APPARATUS FOR A PUNCH PRESS

[75] Inventor: William B. Scott, Rochelle, Ill.

[73] Assignee: W. A. Whitney Corp., Rockford, Ill.

[21] Appl. No.: 647,122

[22] Filed: Sep. 4, 1984

[51] Int. Cl.$^4$ ............................................. B23Q 3/157
[52] U.S. Cl. ........................................ 29/568; 83/698;
 294/86.4; 414/751
[58] Field of Search .......................... 29/568; 414/751;
 901/30, 41, 50; 294/86.4; 83/698

[56] References Cited

U.S. PATENT DOCUMENTS

| | | | |
|---|---|---|---|
| 3,678,562 | 7/1972 | Leibinger | 29/400 |
| 3,816,904 | 6/1974 | Herb | 29/568 |
| 4,423,546 | 1/1984 | Scott et al. | 29/568 |
| 4,485,549 | 12/1984 | Brolund | 29/568 |

FOREIGN PATENT DOCUMENTS 2108019 5/1983 United Kingdom ................ 29/568

Primary Examiner—James M. Meister
Assistant Examiner—John L. Knoble
Attorney, Agent, or Firm—Leydig, Voit & Mayer, Ltd.

[57] ABSTRACT

Cartridges each containing a different punch, stripper and die are moved automatically by a robot-like transfer mechanism between a punch press and a tool rack for storing several of the cartridges. The transfer mechanism includes two hook-like hands each having notched, cartridge-carrying jaws which may be opened and closed relative to the cartridge, which captivate the cartridge laterally but which allow the cartridge to float vertically. As a result of the vertical floating permitted by the hook-like hands, the transfer mechanism may be programmed in the relatively simple manner of a computer-controlled machine tool and does not require the complex programming of a true robot.

1 Claim, 16 Drawing Figures

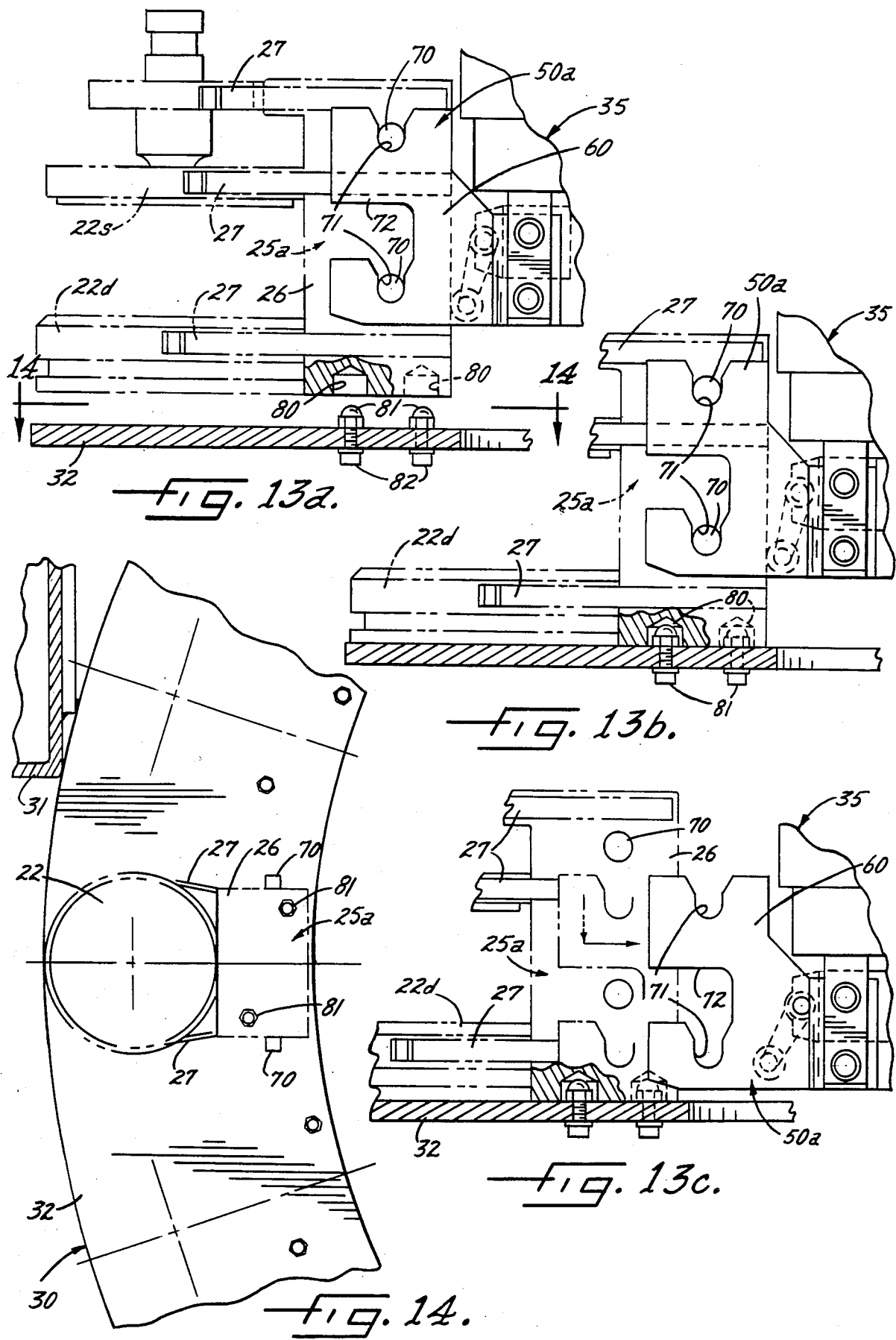

TOOL CHANGING APPARATUS FOR A PUNCH PRESS

BACKGROUND OF THE INVENTION

This invention relates generally to an automatic tool changer for a machine tool and, more particularly, to programmable apparatus for automatically changing the punch, stripper and die of a punch press.

The tool changing apparatus of the present invention is especially useful in connection with a punch press of the type in which the punch, stripper and die are held removably in a cartridge when the tools are idle. When the tools are to be used, the cartridge is inserted into the press, the tool holding devices of the press are actuated to lock the tools in the press, and then the cartridge is withdrawn to leave the tools in the press. When the tools have completed their work, the cartridge is returned to pick up the tools preparatory to another cartridge with different tools being inserted into the press.

In the machine tool organization of the invention, several cartridges (e.g., eighty cartridges) all with different tools are contained in a tool storage rack having vertically spaced shelves for holding the cartridges. The automatic tool changing apparatus includes a transfer mechanism or so-called "robot" which is shifted to a selected tool cartridge on a storage shelf, lifts the cartridge from the shelf, shifts the cartridge horizontally toward the punch press, inserts the cartridge into the press to deliver the tools to the press and then withdraws from the press while the tools are being used. After the tools have completed their punching operation, the transfer mechanism re-inserts the cartridge into the press to pick up the tools, shifts the cartridge back to the storage rack, lowers the cartridge onto the shelf and releases the cartridge preparatory to shifting to a different position to pick up another cartridge at a different location on the rack.

When a tool changing transfer mechanism is in the form of a true robot, it is a difficult and very time-consuming operation to program or "teach" the robot to shift to all of its various positions and to stop at precisely predetermined locations. Such "teaching" is conventionally accomplished by a person leading the robot step-by-step through its various moves and positions and using a teaching control to establish the program as the robot is placed through its moves. This usually must be done after the machine tool and the tool changer have been installed and, in most cases, the robot of each tool changer of a like group must be separately and individually programmed.

SUMMARY OF THE INVENTION

The general aim of the present invention is to provide an automatic tool changer having a new and improved robot-like transfer mechanism which may be programmed in the relatively quick and simple manner of a standard computer-controlled machine tool and which does not require the complex and time-consuming programming necessary for true robots.

A related object is to provide a tool-changing transfer mechanism which may operate effectively when commanded to travel to general positions in space as opposed to pinpoint locations.

A further object of the invention is to provide an easily programmable transfer mechanism which is capable of picking up cartridges from a tool rack even though the cartridges are not precisely located on the rack. As a result, the tool rack need not be of precision construction to accommodate the movements of the transfer mechanism but instead may be fabricated in a relatively easy and inexpensive manner.

A more detailed object is to achieve the foregoing by providing a tool changer in which the tool cartridge is capable of floating vertically in the transfer mechanism so that neither the cartridge nor the transfer mechanism need be precisely positioned in order for the transfer mechanism to pick up, transfer and place the cartridge.

Still another object is to provide a robot-like transfer mechanism having a novel hook-like "hand" which may be opened and closed relative to the cartridge, which normally captivates the cartridge laterally but which allows the cartridge to float vertically when the cartridge is picked up and placed.

These and other objects and advantages of the invention will become more apparent from the following detailed description when taken in conjunction with the accompanying drawings.

BRIEF DESCRIPTION OF THE DRAWINGS

FIGS. 13a, 13b and 13c are fragmentary side elevational views of the hand and showing the hand in successively moved positions as the hand places a cartridge on the tool storage shelf.

FIG. 14 is a fragmentary cross-section taken substantially along the line 14-14 of FIG. 13a.

DETAILED DESCRIPTION OF THE PREFERRED EMBODIMENT

Figure 1:
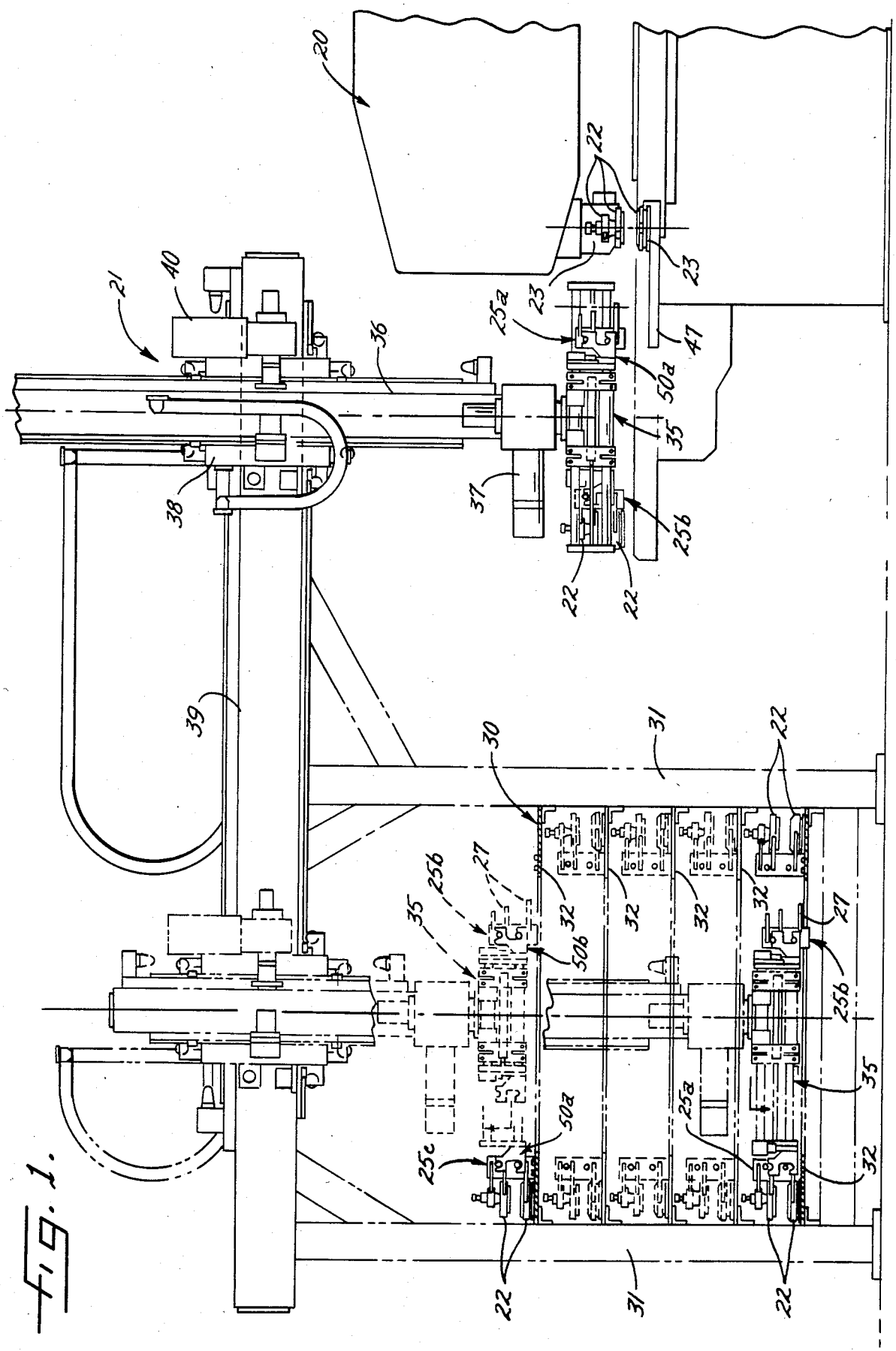
FIG. 1 is a fragmentary side elevational view showing a typical punch press and showing new and improved automatic tool changing apparatus incorporating the unique features of the present invention.

As shown in the drawings for purposes of illustration, the invention is embodied in a machine tool organization comprising a machine tool in the form of a punch press 20 for forming holes in a work sheet (not shown) and further comprising tool changing apparatus 21 for automatically placing sets of tools 22 in and removing the tools from the punch press. In the present instance, each set of tools 22 comprises an upper punch 22P, an intermediate stripper 22S and a lower die 22D (see FIG. 9).

The punch press 20 itself is of a previously known construction and may be of the same general type as the press disclosed in Brolund U.S. Pat. No. 4,485,549, filed May 9, 1983, entitled Apparatus For Changing The Tools Of A Punch Press and assigned to the assignee of the present invention. Briefly, such a press includes holders 23 (FIG. 2) for the tools 22. After the tools have been inserted sidewise into the holders, locking devices (not shown) may be automatically actuated to retain the tools securely in the holders during the punching operation.

Figure 9:
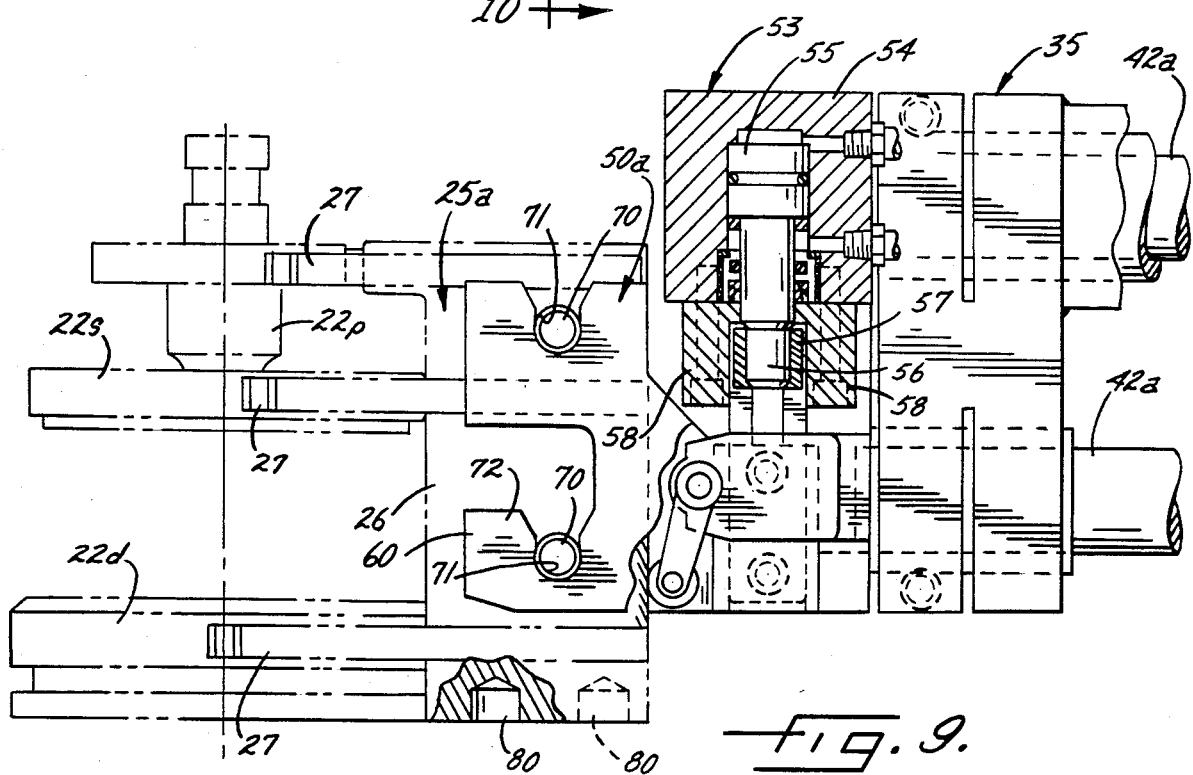
FIG. 9 is a fragmentary cross-section taken substantially along the line 9—9 of FIG. 8.

As shown most clearly in FIG. 9, the punch 22P, the stripper 22S and the die 22D of each tool set are held by a cartridge 25 when the tool set is not actually working in the press 20. The cartridge comprises an upright, block-like body 26 having three vertically spaced pairs of laterally spaced spring fingers 27 for releasably gripping and holding the three tools 22 of the tool set. By advancing the cartridge forwardly into the press 20, the tools may be inserted sidewise into the holders 23. After the locking devices associated with the holders have been actuated to lock the tools in the holders, the cartridge is retracted rearwardly. As an incident thereto, the spring fingers automatically release the tools to leave the tools in the holders while permitting the cartridge to retract. After the tools have finished their work, the empty cartridge is advanced toward the press to cause the spring fingers to automatically snap over and grip the tools. Once the locking devices of the holders have been released, the cartridge is retracted to pull the tools sidewise out of the holders.

A tool-holding cartridge of the foregoing type is disclosed in Leibinger U.S. Pat. No. 3,678,562. Also, a tool changing operation somewhat similar to the present tool changing operation is explained in detail in Scott et al U.S. Pat. No. 4,423,546.

Several cartridges 25 containing punches 22P, strippers 22S and dies 22D of different sizes and shapes are contained in a tool storage rack 30 (FIG. 1) located in front of the punch press 20. The rack includes a main frame 31 and five vertically spaced and generally C-shaped horizontal shelves 32 attached to the main frame. In the present instance, each shelf supports sixteen cartridges in angularly spaced relation so that a total of eighty different tool sets is stored in the rack. The open throats of the C-shaped shelves face toward the punch press 20.

In general, the tool changing apparatus 21 is adapted to automatically pick up a selected cartridge 25 from its underlying shelf 32, deliver the cartridge to the press 20, advance the cartridge into the press so that the tools 22 may be locked in the holders 23, and then retract the empty cartridge out of the press so that the tools will be free to punch the work sheet. After the punching operation has been completed, the apparatus re-advances the cartridge toward the press to pick up the tools, retracts the tools from the holders 23 and ultimately returns the loaded cartridge to the proper shelf of the tool storage rack 30. Thereafter, the apparatus picks up another cartridge from the rack and delivers that cartridge to the press.

For the foregoing purposes, the tool changing apparatus 21 includes a robot-like transfer mechanism 35 adapted to hold a cartridge 25A at one of its ends and adapted to hold a second cartridge 25B at its other end. The transfer mechanism is mounted for rotation about a vertical axis on the lower end of a vertically extending carriage 36 (FIG. 1) and is adapted to be turned end-for-end by a motor 37. The carriage 36 is mounted to move upwardly and downwardly by a head 38 which, in turn, is mounted on a horizontal gantry 39 to move back and forth between the press 20 and the tool rack 30. Accordingly, the transfer mechanism 35 may be moved horizontally back and forth, may be raised and lowered and may be turned end-for-end about a vertical axis. A motor 40 associated with the carriage 36 effects up and down shifting of the transfer mechanism while an additional motor (not visible) associated with the head 38 effects back and forth movement of the transfer mechanism along the gantry 39. The gantry is supported on and extends cantilever fashion from the frame 31.

In addition to being movable horizontally back and forth with the transfer mechanism 25 between the press 20 and the tool rack 30, each of the cartridges 25A and 25B on the ends of the transfer mechanism may be independently advanced and retracted in a horizontal direction. To this end, the cartridge 25A is adapted to be carried by the ends of a pair of vertically spaced rods 42A (FIGS. 3 and 4) which are guided for back and forth horizontal sliding by a guide head indicated in its entirety by the reference numeral 43 and forming part of the rotatable transfer mechanism 35. The slide rods are located at one side of the guide head and are adapted to be shifted back and forth by a hydraulic cylinder 44A (FIGS. 3 and 7) connected to the guide head and having a reciprocating rod 45A connected to a vertical bar 46A spanning the ends of the slides rods. When the cylinder is actuated, the rod 45A either extends or retracts to advance or retract the slide rods 44A and the cartridge 25A relative to the guide head 43.

Similarly, the cartridge 25B is adapted to be carried by the ends of a second pair of vertically spaced rods 42B (FIGS. 4 and 7) located on the opposite side of the guide head 43 and supported thereon for back and forth horizontal sliding. A second hydraulic cylinder 44B (FIG. 7) is connected to the guide head and includes a reciprocating rod 45B connected to a bar 46B extending vertically between the ends of the slide rods 42B. Actuation of the cylinder 44B results in the rod 45B either extending or retracting to advance or retract the slide rods 42B and the cartridge 25B relative to the guide head 43. Each cartridge 25A and 25B may be advanced and retracted relative to the guide head 43 independently of the other cartridge.

The operation of the tool changing apparatus 21 as described thus far will now be explained. To facilitate the explanation, let it be assumed that the transfer mechanism 35 is located adjacent the front of the press 20 in a standby position as shown in solid lines at the right-hand side of FIG. 1 and as further shown in phantom lines in FIG. 2. Let it further be assumed that the cartridge 25A is empty and that the tools 22 for that cartridge are in working position in the press 20. Finally, assume that the next set of tools to be used by the press is held in the cartridge 25B at the opposite end of the transfer mechanism 35 when the latter is in the aforementioned standby position. When the transfer mechanism is in its standby position, it is slightly elevated so that the bottom of the cartridge 25A is spaced upwardly from a precision manufactured and accurately positioned locating plate 47 attached rigidly to and extending forwardly from the press.

Figure 2:
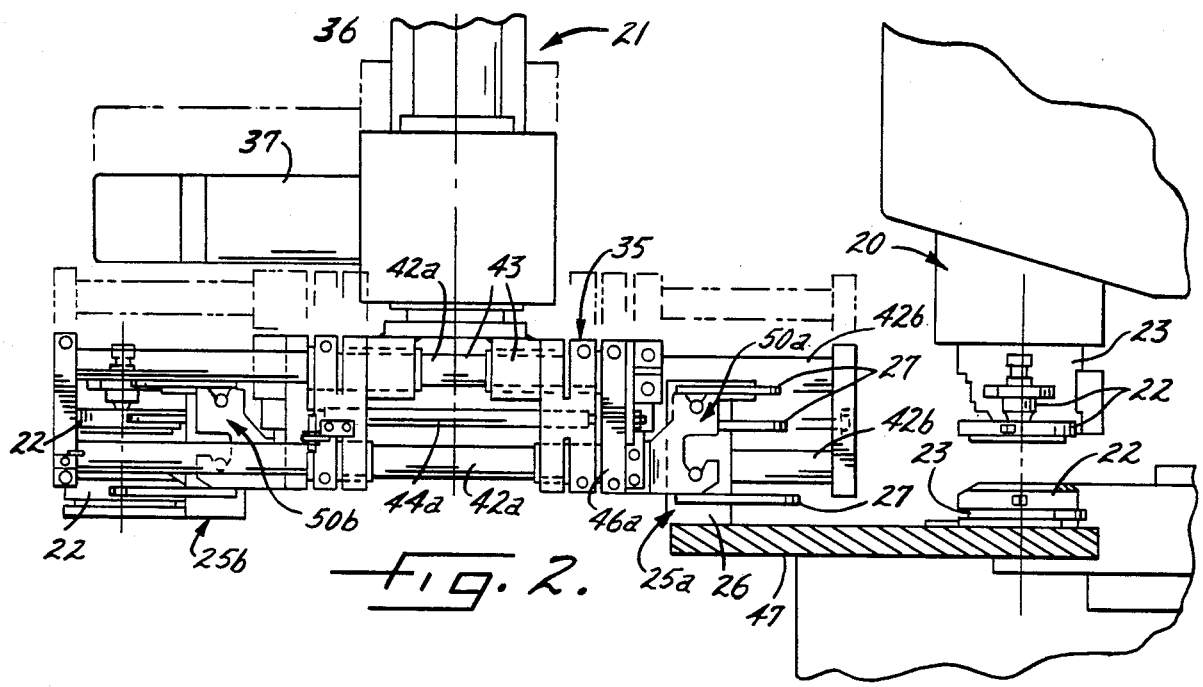
FIG. 2 is a fragmentary side elevation on an enlarged scale of certain parts illustrated in FIG. 1 and particularly shows the robot-like transfer mechanism.

Upon completion of the working cycle of the tools 22 for the cartridge 25A, the entire transfer mechanism 35 is lowered by the motor 40 until the bottom of the cartridge 25A rests on the plate 47 as shown in solid lines in FIG. 2. The plate locates the cartridge precisely at the proper elevation to pick up the tools from the holders 23.

Figure 3:
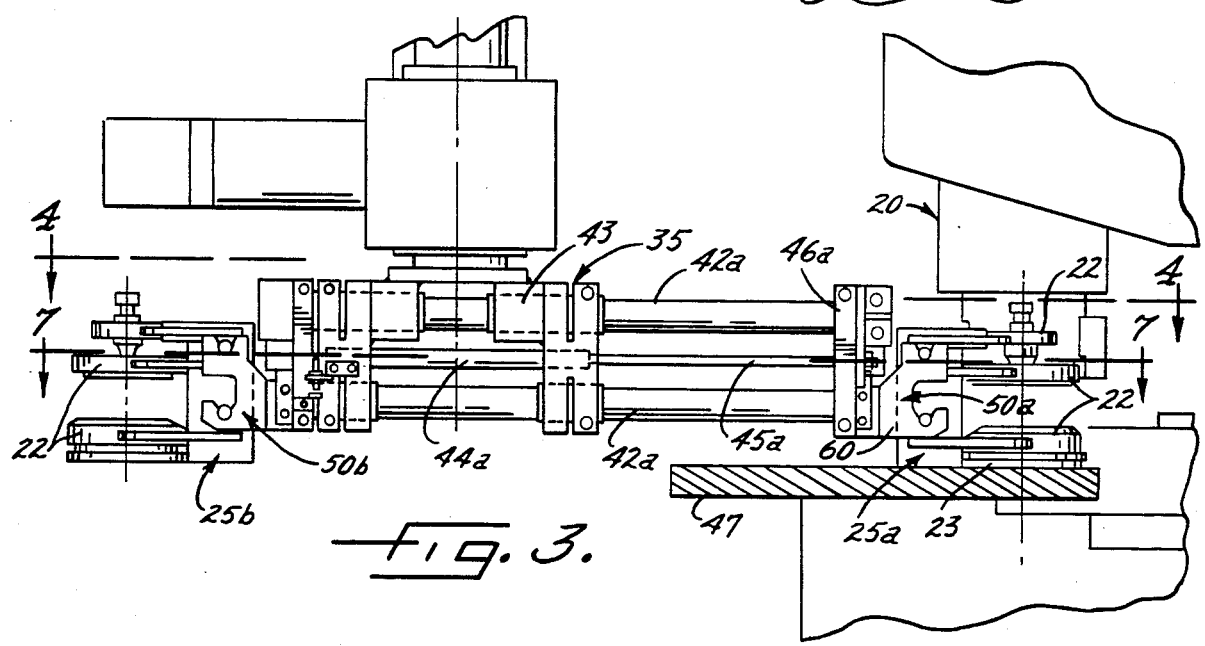
FIG. 3 is a view similar to FIG. 2 but shows the transfer mechanism inserting the tool cartridge into the press.
Figure 4:
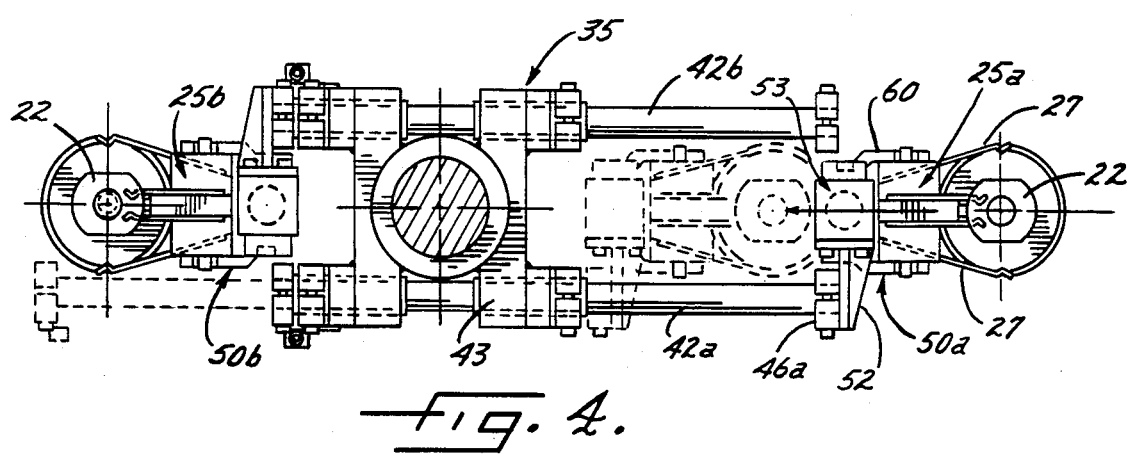
FIG. 4, is a cross-section taken along the line 4—4 of FIG. 3.
Figure 7:
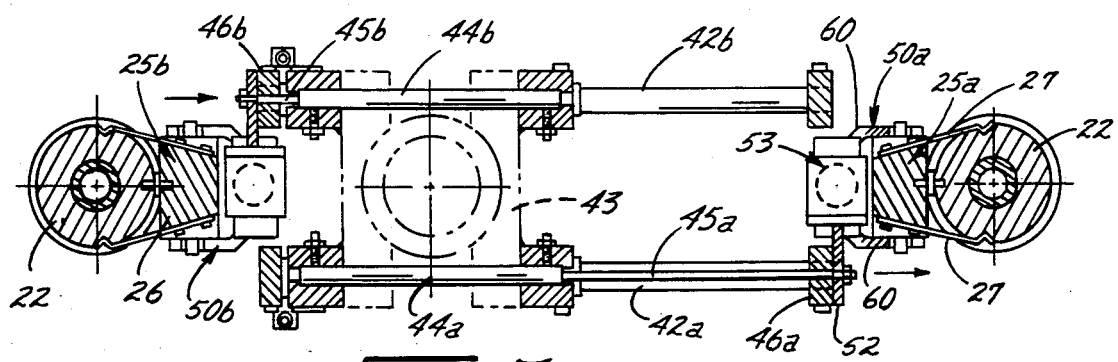
FIG. 7 is a fragmentary cross-section taken substantially along the line 7—7 of FIG. 3.

After the transfer mechanism 35 has been lowered, the cylinder 44A is actuated to advance the cartridge 25A toward the holders 23 as shown in FIGS. 3, 4 and 7. During such advance, the spring fingers 27 of the cartridge snap over and grip the tools in the holders. Thereafter, the locking devices associated with the holders are released to enable the cartridge to remove the tools from the holders.

The cylinder 44A then is actuated to retract the cartridge 25A back to the position shown in FIG. 2 and to take the tools 22 out of the holders 23. The entire transfer mechanism 35 then is raised by the motor 40 and is returned upwardly to the position shown at the right of FIG. 1 in order to lift the cartridge 25A off of the plate 47.

Figure 5:
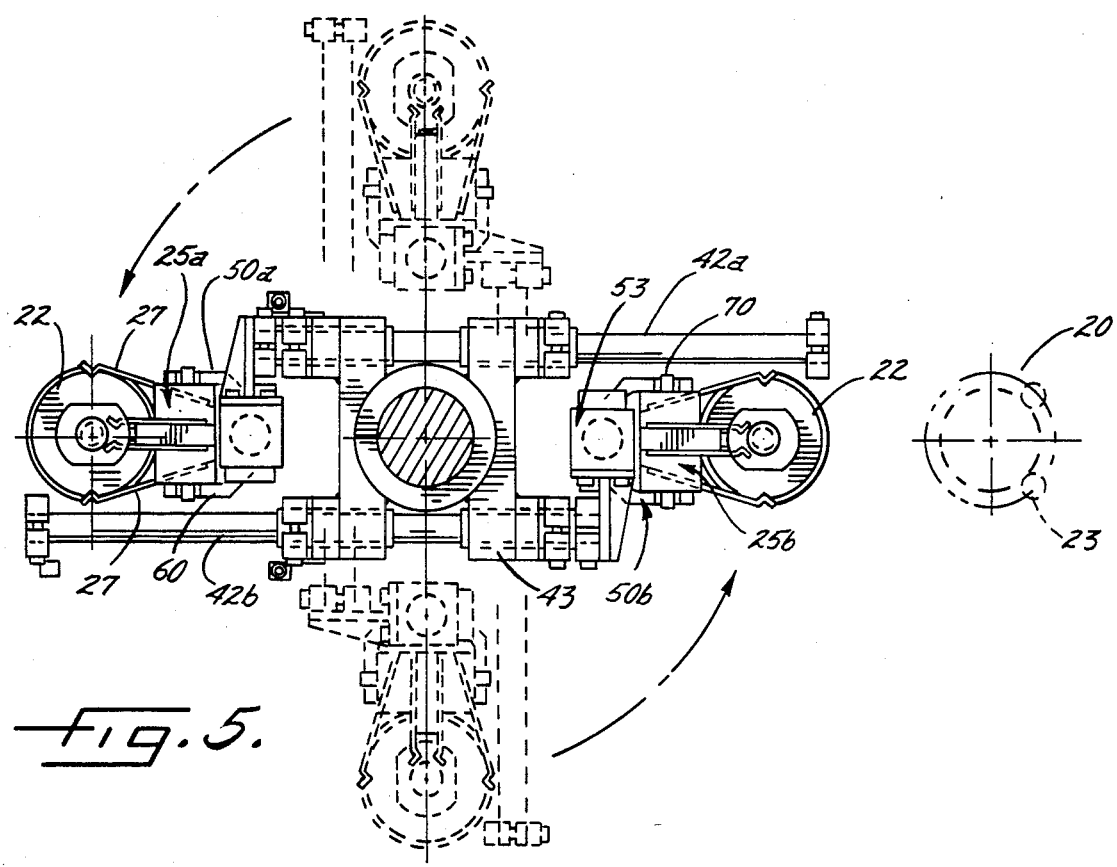
FIGS. 5 and 6 are views similar to FIG. 4 but show the transfer mechanism in successively moved positions.
Figure 6:
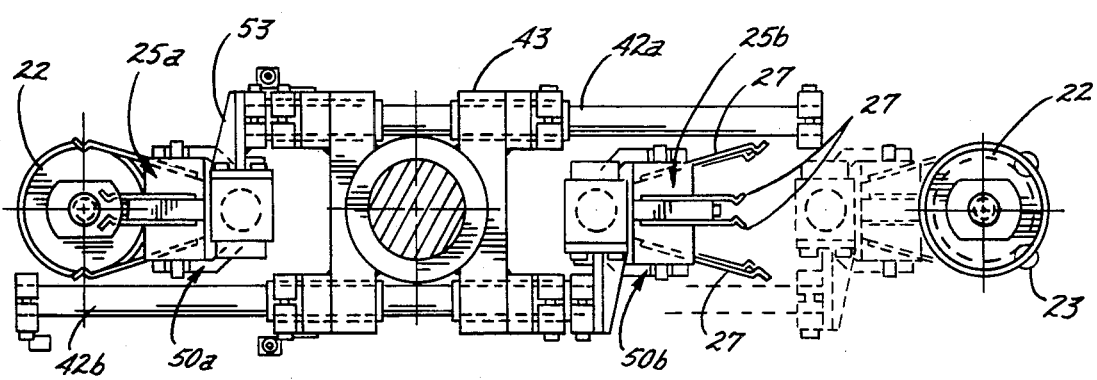

After the transfer mechanism 35 has been raised, it is rotated through 180 degrees by the motor 37 to bring the cartridge 25B to a position adjacent the front of the press 20 as shown in FIG. 5. The transfer mechanism then is lowered to place the cartridge 25B on the locating plate 47 and to position the cartridge at the proper elevation to place its tools 22 in the holders 23. Next, the cylinder 44B is actuated to advance the cartridge toward the press 20 and to place the new tools in the holders as shown in phantom lines in FIG. 6. Following actuation of the locking devices of the holders, the cylinder 44B is actuated to retract the cartridge 25B to the position shown in solid lines in FIG. 6 and thereafter the transfer mechanism 35 is raised by the motor 40 to lift the cartridge 25B off of the plate 47 to the standby position. The cartridge 25B, of course, is empty since its tools are left in the holders to perform a punching cycle.

During the punching cycle, the entire transfer mechanism is shifted horizontally from the press 20 to the storage rack 30 by running the head 38 along the gantry 39 from the position shown in solid lines in FIG. 1 to the position shown in phantom lines. The transfer mechanism 35 moves through the open throats of the C-shaped shelves 32 of the rack 32 and stops moving horizontally when it reaches the vertical centerline of the rack. The transfer mechanism then is shifted vertically to bring the cartridge 25A into proximity with the particular shelf from which the cartridge was previously removed. If necessary, and as usually will be the case, the transfer mechanism also is simultaneously turned angularly to aline the cartridge with its proper angular space on the shelf. In the solid line illustration at the lower left portion of FIG. 1, the transfer mechanism has been shown as having been lowered to a position adjacent the lowermost shelf 32. For simplicity, however, no turning of the transfer mechanism has been shown to have occurred since the particular cartridge 25A which has been illustrated occupies a shelf space directly in line with the back and forth horizontal path of the transfer mechanism.

When the transfer mechanism 35 first stops in the position shown in solid lines at the lower left-hand portion of FIG. 1, the cartridge 25A is in a retracted position and is located with its bottom spaced a short distance above the upper side of the lower shelf 32. With the cartridge 25A in this position, the cylinder 44A is actuated to advance the cartridge to a position overlying the shelf. The transfer mechanism then is shifted downwardly to lower the cartridge onto the shelf, after which the transfer mechanism is uncoupled from the cartridge in a manner to be explained subsequently. After such uncoupling, the cylinder 44A is actuated to retract the slide rods 42A of the transfer mechanism.

The transfer mechanism then is positioned to pick up another cartridge (e.g., a cartridge indicated as 25C in FIG. 1) with different tools 22 from the storage rack 30. In FIG. 1, the cartridge 25C has been shown as being positioned on the top shelf 32 and, for simplicity, has been shown as being directly in line with the recently returned cartridge 25A. Thus, the transfer mechanism 35 is raised to a position in proximity with the cartridge 25C (see the phantom line illustration at the left of FIG. 1) but is not turned as otherwise would occur if the cartridge 25C were spaced angularly from the cartridge 25A.

With the transfer mechanism 35 at the proper elevation relative to the cartridge 25C, the cylinder 44A is actuated to cause the slide rods 42A to advance toward that cartridge. Thereafter, the transfer mechanism is coupled with the cartridge 25C in a manner to be explained subsequently and is shifted upwardly to lift the cartridge from the top shelf. The cylinder 44A then is actuated to retract the cartridge 25C, after which the head 38 is shifted along the gantry 39 to move the transfer mechanism 35 from the storage rack 30 to the press 20. After being positioned in front of the press, the transfer mechanism is lowered to the standby position to complete one cycle of the tool changing operation.

As is apparent from the foregoing, the transfer mechanism 35 moves through a large number of different positions during a tool changing cycle and, in the present instance, is required to handle different cartridges located at eighty different positions on the rack 30. Movement of the transfer mechanism is controlled automatically by a computerized numerical control. If movement of the transfer mechanism was programmed in the manner of a true robot, it would be necessary for a person to "walk" the transfer mechanism through all of its various moves and positions and to use a teaching control to establish the program point-to-point in space. This is a very time-consuming operation which usually must be performed at the actual installation site and which usually must be performed individually for each separate installation.

In accordance with the present invention, the transfer mechanism 35 is equipped with unique "hands" 50A and 50B which are adapted to couple up with the cartridges 25 and which enable movement of the transfer mechanism 35 to be programmed in the relatively simple manner conventionally used in standard machine tool programming. Each hand is characterized in that, when it is coupled with a cartridge, it restricts lateral movement of the cartridge relative to the transfer mechanism but allows the cartridge to float vertically. As a result of such floating, the hand may reliably pick up and deposit cartridges even though the cartridges are located only in approximate positions on the shelves 32 and even though the transfer mechanism is programmed in the general manner of a machine tool and not in the "taught" point-to-point manner of most true robots. Thus, the invention greatly simplifies the programming of the tool changing apparatus 21 and, at the same time and as will become more apparent, enables the use of an inexpensive fabricated tool storage rack 30.

The hand 50A on one end of the transfer mechanism 35 is virtually identical to the hand 50B on the other end of the transfer mechanism and thus only the construction and operation of the hand 50A will be described in detail. In FIGS. 8 to 14 where the hand 50A is illustrated in detail, the hand is shown turned to the same general orientation which it assumes when it is positioned adjacent the tool rack 30 to pick up and deposit cartridges 25.

Figure 8:
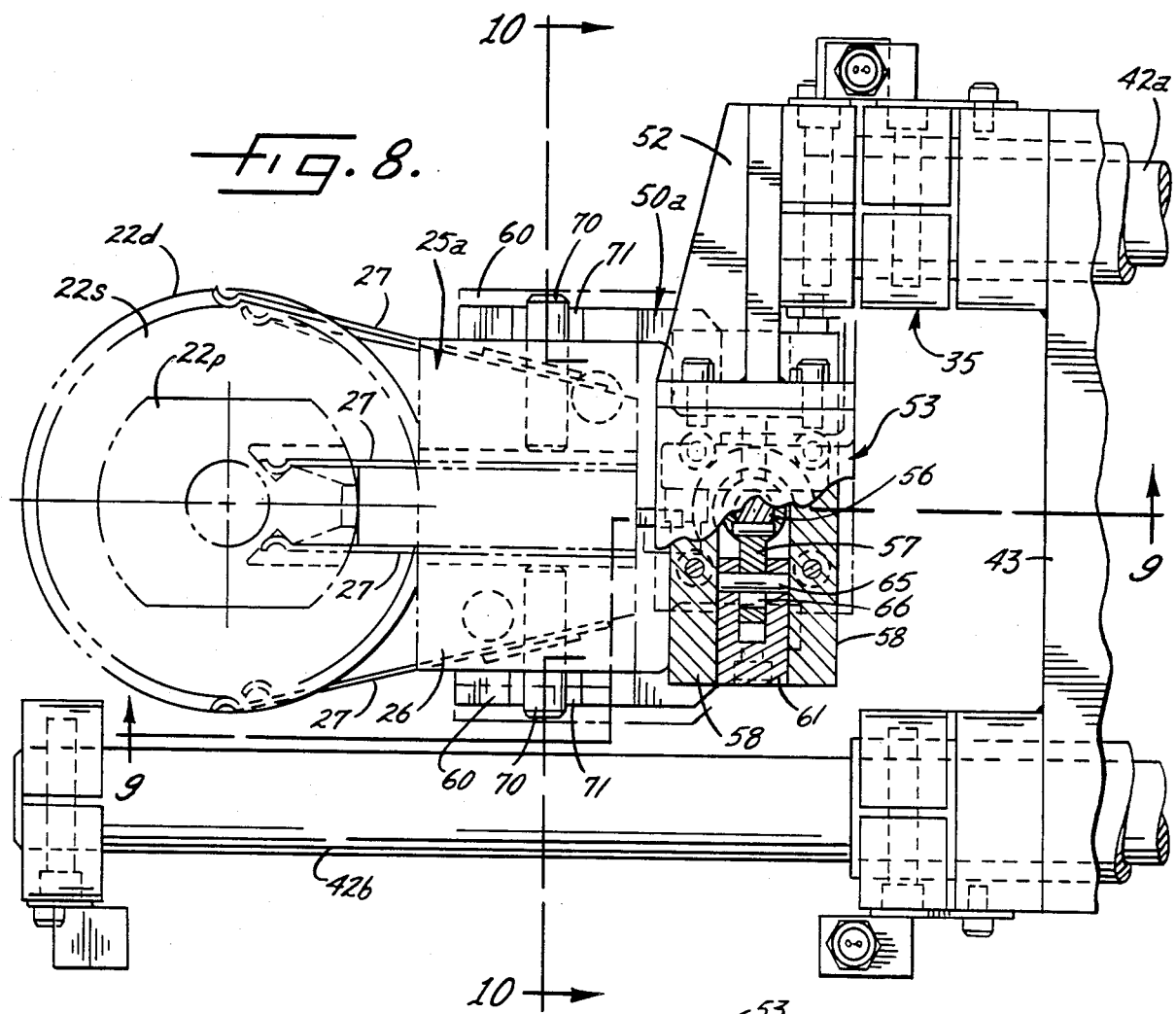
FIG. 8 is an enlarged top plan view of the left-hand portion of the transfer mechanism shown in FIG. 6, certain parts of the mechanism being broken away and shown in section.

Specifically, the hand 50A includes a mounting bracket 52 (FIGS. 7 and 8) which is attached to the bar 46A at the ends of the slide rods 42A, the bracket extending laterally inwardly from the slide rods as shown in FIG. 8. Attached to the bracket is a hydraulic actuator 53 (FIGS. 9 and 10) having a cylinder 54, having a piston 55 supported for up and down sliding in the cylinder and having a rod 56 attached to the lower end of the piston. The rod 56 is advanced downwardly when the upper compartment of the cylinder 54 is pressurized and is retracted upwardly when the lower compartment of the cylinder is pressurized.

An actuating bar 57 (FIGS. 8, 10 and 12) is attached rigidly to the lower end of the rod 56 and extends laterally in opposite directions from the rod. The actuating bar is located between a pair of spaced laterally extending guide ways 58 (FIGS. 8, 9 and 12) which are attached to and project downwwardly from the lower end of the cylinder 54.

Figure 10:
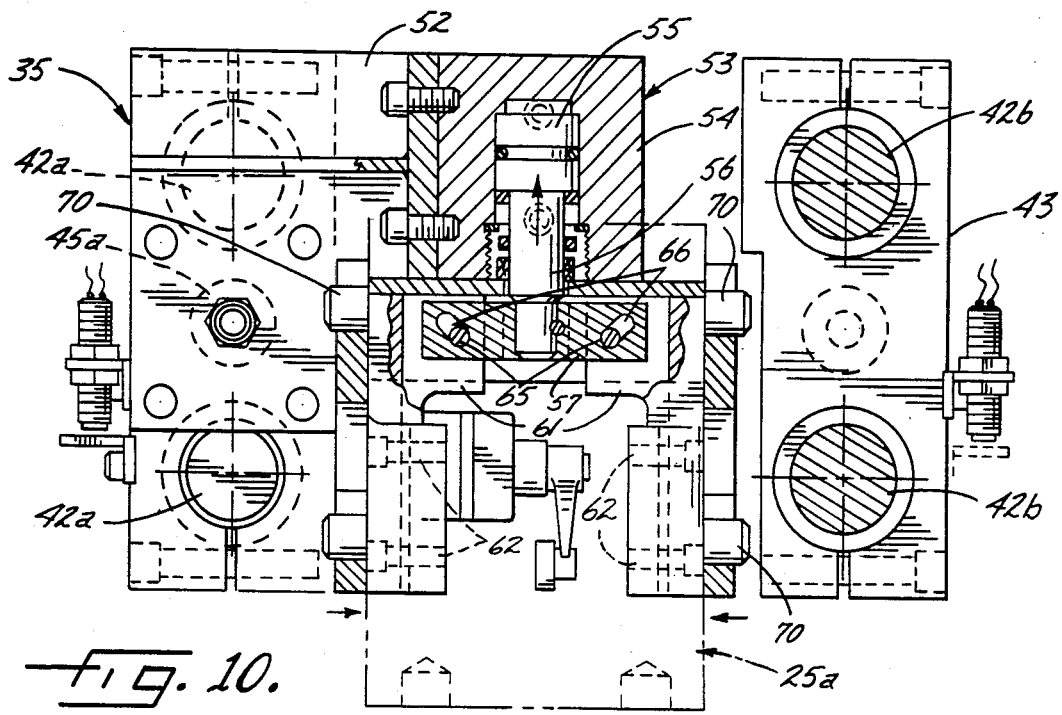
FIG. 10 is a fragmentary cross-section taken substantially along the line 10—10 of FIG. 8 and shows the hand of the transfer mechanism in a closed position.
Figure 11:
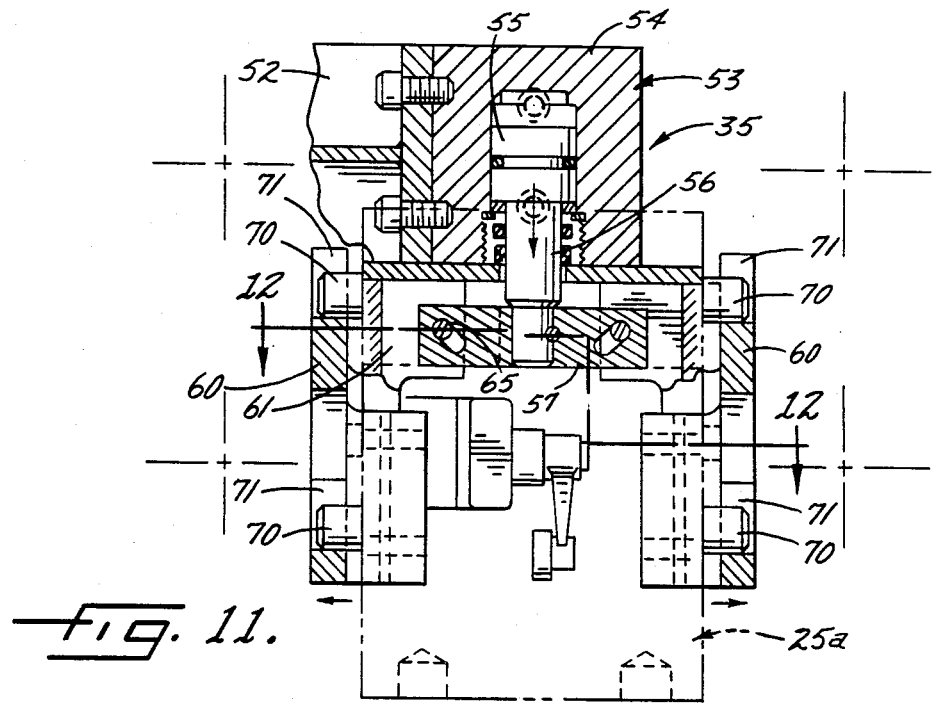
FIG. 11 is a fragmentary cross-section similar to FIG. 10 but shows the hand of the transfer mechanism in an open position.
Figure 12:
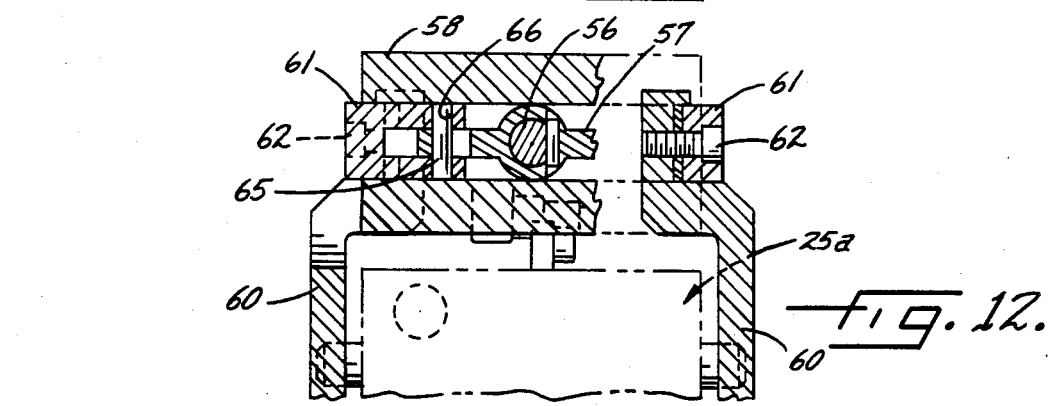
FIG. 12 is a fragmentary cross-section taken substantially along the line 12—12 of FIG. 11.

In carrying out the invention, the hand 50A includes a pair of laterally spaced retainers or "jaws" 60 guided by the ways 58 for lateral movement between first or open positions and second or closed positions and adapted, when in their closed positions, to embrace the cartridge 25A and captivate the cartridge against lateral movement when the cartridge is being carried by the hand 50A. Herein, each jaw 60 is an upright substantially plate-like member which is attached to an inverted L-shaped mounting bracket 61 by screws 62 (FIGS. 10 and 12). The upper portions of the two mounting brackets are guided for back and forth lateral sliding by the ways 58 and thus support the jaws 60 for lateral movement between their closed positions (FIG. 10) and their open positions (FIG. 11).

To effect shifting of the jaws 60 between their open and closed positions, a pin 65 (FIGS. 10 and 12) is attached rigidly to the upper portion of each mounting bracket 61 and extends through a downwardly and inwardly angled slot 66 formed in the end portion of the actuator bar 57. When the hydraulic actuator 53 advances the bar 57 downwardly from the position shown in FIG. 10 to the position shown in FIG. 11, the upper side edges of the angled slots 66 cam against the pins 65 and force the jaws 60 to shift laterally outwardly to their open positions. Conversely, the lower side edges of the slots 66 cam against the pins 65 and cause the jaws to move inwardly to their closed positions when the actuator 53 retracts the bar 57 upwardly. When the jaws are in their open and closed positions, they are centered with respect to the longitudinal centerline of the transfer mechanism 35.

Further in carrying out the invention, each retaining element or jaw 60 includes unique means adapted to coact with lifting elements 70 on the cartridge 25A to enable the jaws to lift and carry the cartridge while still enabling the cartridge to float vertically relative to the jaws. Herein, the lifting elements 70 comprise horizontal pins (FIGS. 8 TO 14) attached rigidly to and projecting laterally from opposite sides of the body 26 of the cartridge, there being two vertically spaced pins at each side of the cartridge. The means which coact with the pins to lift the cartridge comprise upwardly opening notches 71 formed in the jaws 60, each jaw having upper and lower vertically spaced notches for receiving the upper and lower pins.

As shown most clearly in FIG. 9, the upper notch 71 of each jaw 60 opens upwardly out of the upper end of the jaw and includes an upwardly flaring upper portion and a vertical-sided lower portion. The upper portion of the notch defines a throat having a width significantly greater than the diameter of the pin 70 so as to enable the pin to easily enter the notch even when the pin is offset from the vertical centerline of the notch. The width of the vertical-sided lower portion of the notch, however, closely approximates the diameter of the pin so as to captivate the pin against any substantial fore- and aft movement when the pin is fully seated in the notch.

The lower notch 71 of each jaw 60 includes an upwardly flared upper portion and a vertical-sided lower portion identical to the upper notch. The upper end portion of the lower notch, however, opens into a large slot 72 (FIG. 9) formed through the jaw 60 and opening out of the outboard end of the jaw. The slot 72 permits the lower pin 70 to enter and leave the lower notch 71 when the jaw is moved toward and away from the cartridge 25A.

The operation of the hand 50A now will be described. When the transfer mechanism 35 is in its standby position shown at the right side of FIG. 1, the cartridge 25A is held in the hand 50A by virtue of the four lifting pins 70 on the cartridge being disposed in and bottomed out against the four notches 71 of the jaws 60. At this time, the jaws are in their closed positions and closely embrace the sides of the body 26 of the cartridge to captivate the pins against lateral shifting in the notches and thereby captivate the entire cartridge against any significant lateral shifting. Although the retaining elements 60 have been referred to as being "jaws" for purposes of convenience, there is between 0.005" and 0.010" total clearance between the two jaws 60 and the sides of the cartridge when the jaws are closed. Thus, the jaws do not tightly grip the cartridge and, at most, only lightly contact the cartridge when the jaws are in their closed positions. As a result, the cartridge is free to float vertically within the notches and relative to the jaws even when the jaws are closed.

The jaws 60 remain in their closed positions when the transfer mechanism 35 shifts downwardly from its standby position and places the cartridge 25A on the locating plate 47 at the front of the press 20 (see FIG. 2). After the cartridge stops on the plate, the transfer mechanism may continue to move downwardly a short distance as permitted by the notches 71 as long as the pins 70 remain in the vertical-sided lower portions of the notches. Accordingly, the notched hand 50A eliminates the need for stopping downward movement of the transfer mechanism precisely when the cartridge first stops against the plate. Thus, the hand allows wider latitude in programming the stopped position of the transfer mechanism and compensates for positioning inaccuracies which might accumulate throughout the system.

The jaws 60 also remain closed when the hand 50A is advanced from the position shown in FIG. 2 to the position shown in FIG. 3 to cause the spring fingers 27 to grip the tools 22 in the press 20. When the hand is subsequently retracted to withdraw the tools from the press, the jaws are shifted to open positions in which the jaws are spaced laterally from the sides of the cartridge with substantial clearance. It has been found that the ability of the cartridge to shift laterally in the open jaws as the tools are withdrawn from the holders reduces the danger of the tools being pulled off of the spring fingers 27. The jaws are reclosed before the transfer mechanism is raised to lift the cartridge off of the plate.

It will be noted parenthetically here that the only time the jaws 60 are open while the hand 50A is adjacent the press 20 is the above-described situation where the hand is being retracted to cause the cartridge to withdraw tools from the holders. The jaws are closed when the hand is advanced to cause the cartridge to place tools in the holders and also are closed when the hand subsequently is withdrawn to retract the empty cartridge from the holders.

The jaws 60 of the hand 50A are in their closed positions as the transfer mechanism 35 traverses horizontally toward the storage rack 30 to return the cartridge 25A to the appropriate shelf 32. The jaws remain closed when the transfer mechanism shifts downwardly to lower the cartridge from a position above the shelf (FIG. 13a) to a position on the shelf (FIG. 13b). When downward movement of the cartridge is stopped by the shelf, the transfer mechanism 35 continues its downward movement to cause the notches 71 in the jaws to move downwardly to positions well clear of the pins as shown in phantom in FIG. 13c. It will be apparent that the notched jaws 60 avoid the need for establishing a precise relationship between the elevation of the shelf 32 and the elevation at which downward movement of the hand is stopped. Indeed, a dimensional difference on the order of 5/16" between the two elevations can easily be accommodated. As a result, the rack 30 can be designed with loose tolerances and can be made with relatively simple and low cost fabricating techniques. The system does not require an expensive precision rack or a rack with precise locating surfaces.

As shown in FIG. 13a, two downwardly opening sockets 80 are formed in the bottom side of the cartridge 25A. When the cartridge is lowered onto the shelf 32, the sockets telescope downwardly with substantial clearance over a pair of locators 81 extending upwardly from the shelf. In the present instance, the locators 81 are simply in the form of domed nuts which are threaded onto screws 82 extending upwardly through the shelf, there being two nuts 81 at each cartridge position. The nuts and the sockets coact to prevent horizontal shifting of the cartridge when the cartridge is resting on the shelf. Because the sockets fit very loosely over the nuts, there is no need to establish a precise relationship between the position of the nuts and the position occupied by the cartridge when the latter is spaced above the nuts as shown in FIG. 13a. The sockets may be offset substantially from the nuts and still fit downwardly over the nuts when the cartridge is lowered. This significantly reduces the precision required for the locators on the tool rack and allows the transfer mechanism 35 to be programmed to move the cartridge to just a general position over the shelf rather than a pinpoint position.

Once the hand 50A has been lowered so that the notches 71 clear the pins 70, the jaws 60 are opened to the position shown in FIG. 11. As a result of the substantial clearance between the open jaws and the cartridge 25A, the jaws do not disturb the position of the cartridge on the shelf 32 when the cylinder 44A is actuated to retract the hand away from the cartridge as shown in full lines in FIG. 13c.

The jaws 60 remain open when the transfer mechanism 35 is raised, lowered and/or turned to position the hand in the vicinity of the next cartridge 25C to be picked up from the rack 30. Again, it is not necessary that the hand 50A be located at a precise elevation to pick up the cartridge. Once the hand has been located at a general elevation, the cylinder 44A is actuated to extend the hand. As an incident thereto, the open jaws pass freely alongside the cartridge and the notches 71 move to positions beneath the pins 70. It will be noted that the open jaws will advance into straddling relationship with the cartridge even though the cartridge may be out of position by as much as ⅛" on the shelf. Thus, the hand also accommodates a cartridge which is not in a precise horizontal position on the shelf.

Once the notches 71 have been positioned beneath the pins 70 as shown in phantom in FIG. 13c, the transfer mechanism 35 is raised to shift the hand 50A upwardly and to cause the pins to seat in the notches. Thereafter, the jaws 60 lift the cartridge from the shelf 32 and, as soon as the sockets 80 clear the domed nuts 81 as shown in FIG. 13a, the jaws are closed. At this time, one or both of the jaws may push against the cartridge and shift the cartridge laterally until the longitudinal centerline of the cartridge is alined with the longitudinal centerline of the transfer mechanism 35. The jaws remain closed as the transfer mechanism traverses back to the press 20 thereby insuring lateral alinement between the cartridge and the holders 23 when the cartridge subsequently is inserted into the press.

From the foregoing, it will be apparent that the hook-like hands 50 makes the tool changing apparatus 21 "forgiving" in nature in that only a general—as opposed to a very precise—positional relationship need be established between the cartridges 25 and the transfer mechanism 35. As a result, extreme accuracy in establishing the various positions of the transfer mechanism is not required and thus the control program can be created at a "desk" in the same way as machine tool programming as opposed to in the field as is usually required for robot programming. Also, at least major parts of a single general program may be used with all systems of a like nature so as to save the trouble and expense of creating individual programs for each separate system. The hand also eliminates the need for a precision tool rack and further provides a safety advantage. That is, if power to the apparatus 21 is suddenly lost, the hook-like hand continues to hold the cartridge and will not drop the cartridge as otherwise would occur with many robot hands upon power loss.

I claim:

1. The combination of a tool cartridge, a tool storage shelf and apparatus for transferring the cartridge between the shelf and a machine tool, said shelf having upwardly projecting locating means, said cartridge having downwardly opening sockets sized to loosely receive said locating means to restrict horizontal shifting of said cartridge on said shelf, said apparatus comprising a mechanism for lifting and holding the cartridge, means for moving said mechanism upwardly to lift the cartridge from the shelf and above said locating means and for moving said mechanism downwardly to place the cartridge on the shelf with said sockets telescoped over said locating means, means for moving said mechanism horizontally to transfer the cartridge between the shelf and the machine tool, said mechanism comprising a pair of laterally spaced retainers movable between first positions spaced laterally of the cartridge with substantial clearance and second positions disposed closely adjacent the sides of the cartridge, said retainers captivating said cartridge in a substantially fixed lateral position when said retainers are in said second positions, and said mechanism further comprising means for carrying said cartridge when said cartridge is disposed between said retainers, said last mentioned means permitting said cartridge to float vertically relative to said retainers as said cartridge is placed on said shelf.

* * * * *